June 11, 1957     T. C. SODDY     2,795,300
RAILWAY BRAKE BEAM BOTTOM CONNECTION GUARD
Original Filed July 5, 1952
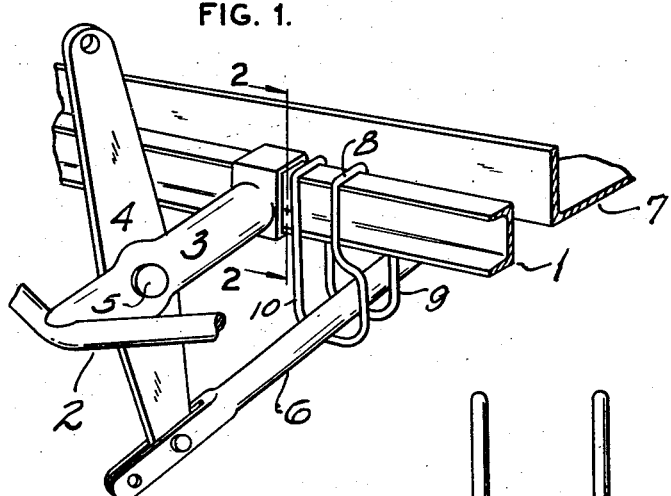
FIG. 1.
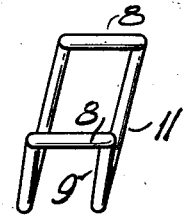
FIG. 4.
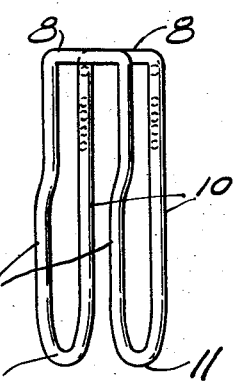
FIG. 6.
FIG. 5.
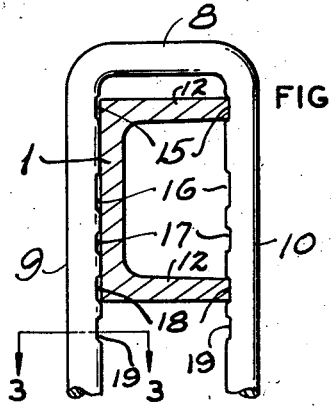
FIG. 2.
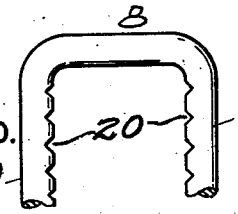
FIG. 10.
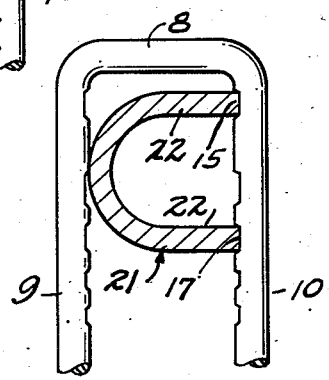
FIG. 7.
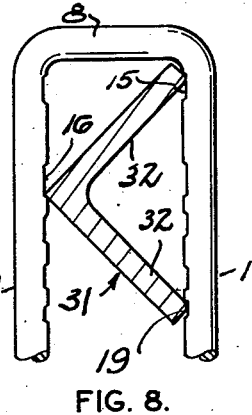
FIG. 8.
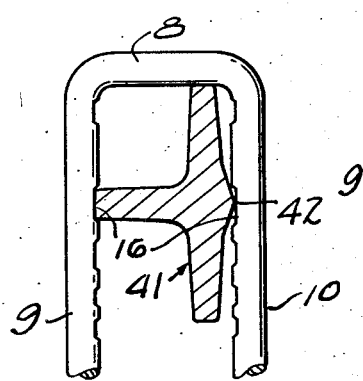
FIG. 9.
INVENTOR.
Thomas C. Soddy
BY Rodney Bedell
atty.

United States Patent Office 2,795,300
Patented June 11, 1957

2,795,300

RAILWAY BRAKE BEAM BOTTOM CONNECTION GUARD

Thomas C. Soddy, Chicago, Ill., assignor to Chicago Railway Equipment Company, Chicago, Ill., a corporation of Illinois Continuation of abandoned application Serial No. 297,330, July 5, 1952. This application May 19, 1954, Serial No. 430,873

5 Claims. (Cl. 188—210)

The invention relates to brake gear for railway rolling stock and consists in a safety guard for the bottom rod usually provided connecting the lower ends of the brake levers of adjacent beams. This application is a continuation of application Serial No. 297,330, filed July 5, 1952. The earlier application is now abandoned in view of the filing of the present application.

More specifically, the invention relates to a bottom connection safety guard of the general type shown in Patent No. 1,724,255, issued August 13, 1929, which discloses a guard of general inverted U-shape, straddling the beam compression member and underlying the bottom connection. The guard shown in said patent includes elements underlying the compression member shown, but if the beam compression member or the guard vary from specified dimensions, vibration and other sudden movements during ordinary travel of the vehicle and during the application and release of the brakes and play between the guard and beam member may let the guard pound the beam or work its way along the beam or upwardly from the desired height.

One object of the present invention is to avoid such pounding, slippage, or creeping of the guard on the beam member.

Another object is to adapt a single form of guard for ready application to brake beam members of different cross sections and effect a similarly secure assembly of the guard and beam member irrespective of the cross section of the latter.

Another object is to adapt such a guard for application to a beam without requiring the workman's attention to whether or not the guard is turned in a given direction to properly engage the beam as desired. Nor will the guard need to be made in rights and lefts.

In the accompanying drawings illustrating a selected embodiment of the invention, Figure 1 is a perspective of the intermediate portion of a railway truss type brake beam and associated parts.

Figure 2 is a transverse vertical section taken on the line 2—2 of Figure 1.

Figure 3 is a detail horizontal section taken on the line 3—3 of Figure 2.

Figure 4 is a top view of the guard before it is applied to the beam and showing the initial offset given to the guard parts to adapt it for different widths of beam members and to insure gripping of the beam members.

Figure 5 is a side view of the guard as shown in Figure 4.

Figure 6 is a front view of the guard as shown in Figures 4 and 5.

Figure 7 corresponds to Figure 2 but shows the guard applied to a beam compression member having a different cross section from that shown in Figures 1 and 2.

Figure 8 corresponds to Figures 2 and 7, but shows the guard applied to a beam compression member having a different cross section.

Figure 9 corresponds to Figures 2, 7, and 8, but shows the guard applied to a beam having a different cross section.

Figure 10 shows a guard with a different form of indentations.

Figure 1 shows the intermediate portion of a truss type brake beam comprising a compression member 1, of channel-like cross section, a tension member 2, of round or strap section, a strut 3 holding the intermediate portions of the compression member and the tension member spaced apart, a brake lever 4, fulcrumed at 5 on strut 3, a bottom connecting rod 6, pivoted to the lower end of lever 4 and extending beneath the beam and a spring plank 7 or similar truck part, for connection at its other end to the lower end of another brake lever corresponding to lever 4.

The guard has a generally inverted U shape (see Figure 5) including horizontal portions or cross bars 8 and depending leg portions 9, 10 which merge to form loops 11 underlying rod 6. Legs 9 are offset lengthwise of the beam below the level of the beam to widen the loops and accommodate shifting of the bottom rod lengthwise of the beam due to lever action and variation in the length of the levers. The initial echelon arrangement of upper portions 8, as best shown in Figure 4, adapts the guard for application to beam members of different width, such as the channel 1 of Figure 2, the U 21 of Figure 7, the L 31 of Figure 8, and the T 41 of Figure 9. The overall width of the T section of Figure 9 is greater than the corresponding width of the channel section in Figure 2 and the L section in Figure 8. The corresponding width of the U section in Figure 7 is still greater. When the bar is placed upon a beam member, the bar is sprung from its normal position, shown in Figure 4, 5, and 6 to more nearly place portions 8 directly abreast of each other. The bar is formed of resilient material, and the distortion of the metal as necessary when the guard is applied to the beam results in the legs firmly gripping beam compression member 1.

Each leg 9, 10 is provided with a series of serrations or recesses 15, 16, 17, 18, 19 having extended flat bottoms disposed to engage relatively narrow edge-like elements on the beam compression member. Preferably the upper recess 15 is spaced below the horizontal portion 8 far enough to provide a space between portion 8 and the top of beam member 1, thus better avoiding wear on the latter.

In Figure 2, recesses 15 and 18 in leg 10 are shown as receiving the ends of the legs 12 of channel 1. In Figure 7, recesses 15 and 17 in leg 10 are shown as receiving the ends of the legs 22 of U section 21. In Figure 8, recesses 15 and 19 in leg 10 are shown as receiving the ends of the legs 32 of L section 31. Recess 16 in leg 9 receives the outer corner of the beam member. In Figure 9, recess 16 in leg 10 receives the edge-like projection 42 formed on the T cross bar and recess 16 in leg 9 receives the end of the T leg.

Serrations 15, 16, 17, 18, 19 are spaced vertically of the legs to correspond closely to the spacing of the edge elements of the different beam compression member sections shown. Figure 10 shows each leg of the guard provided with a series of V-shaped serrations or recesses 20 closer together than recesses 15, 16, 17, 18, 19, and this guard would be relied upon to engage edge elements of the beam member without attempting to fit associated recesses and edge elements, as in the other figures.

The guard structure described adapts a single unit for application to beam compression members of different sections and of widths and it will be unnecessary for the workman to select a particular guard for a particular beam section or to turn the guard in a particular manner in order to apply it to the section. The tendency of the guard to ride along the beam or to move vertically of the beam will be resisted not only by the friction between the opposed faces of the beam and guard but by the fitting of the edges of the beam member into the recesses in the guard legs.

The details of the guard and associated parts may be varied without departing from the spirit of the invention and the exclusive use of those modifications coming within the scope of the claims is contemplated.

What is claimed is:

1. In combination, a railway brake beam including an elongated main member of channel-like cross section, and a bottom rod guard including a cross member with integral depending legs straddling said member, the guard being of resilient material to grip the channel member between the legs of the guard, one of the guard legs extending across the open side of the channel and having vertically spaced recesses spaced below the cross member and receiving the edges of the upper and lower channel flanges respectively and positioning the guard vertically on the channel with said guard cross member spaced substantially above the top of the channel.

2. In combination, a railway truss type brake beam including an elongated compression member of L shape cross section with its legs inclined approximately 45° to the general plane of the beam as determined by the beam compression and tension members, and a bottom rod guard of resilient material and of generally inverted U shape with a cross bar and legs depending therefrom, one leg extending past the outside corner of the compression member angle and having a recess receiving said corner, and the other leg extending past the outer edges of said compression member legs and having spaced recesses receiving said edges, said recesses cooperating with said corner and edges to position the guard vertically on said compression member with the guard cross bar held out of contact with said compression member.

3. In combination, a railway truss type brake beam including an elongated compression member of T-like cross section, comprising a normally horizontal leg and an upright cross bar, there being a restricted projection formed on the outer face of the cross bar of said compression member, and a bottom rod guard of generally inverted U shape and formed of resilient material, and including a horizontal portion and guard legs depending from the horizontal portion, one of said guard legs having a recess receiving said restricted projection, and the other of said legs extending past the outer edge of the compression member leg and having a recess receiving the same, said recesses and the beam member parts received therein positioning the follower vertically on the beam member.

4. A railway brake beam bottom rod guard for application to brake beam members of varying cross section and design comprising a pair of spaced inverted U shape sections, each including a horizontal portion and depending legs for straddling a brake beam main member, the leg of one U-shape section merging at its lower end with the leg of the other U-shape section to form an upwardly facing loop, each leg having a plurality of vertically spaced, relatively deep flat bottom recesses opposing another leg of the loop and adapted to snugly receive therein the edge of a brake beam member to which the guard may be applied.

5. A railway brake beam bottom rod guard as described in claim 4, wherein the various recesses on each leg are in substantial transverse alignment with corresponding recesses on the opposing leg, and the upper of said recesses are spaced a substantial distance below the horizontal portion of the corresponding U-shape section.

References Cited in the file of this patent

UNITED STATES PATENTS

| | | |
|---|---|---|
| 1,644,481 | Moore | Oct. 4, 1927 |
| 1,724,255 | Busse et al. | Aug. 13, 1929 |
| 1,724,265 | Ekholm | Aug. 13, 1929 |
| 2,003,803 | Crone | June 4, 1935 |
| 2,574,107 | Joy | Nov. 6, 1951 |